US012723175B1

(12) United States Patent
Huang et al.

(10) Patent No.: US 12,723,175 B1
(45) Date of Patent: Sep. 1, 2026

(54) CONTROLLING METHOD AND APPARATUS FOR MANUFACTURING WATERSTOP TAPES

(71) Applicant: TAIWAN TEXTILE FEDERATION, Taipei City (TW)

(72) Inventors: Shu-Hui Huang, Taipei City (TW); Yao-Hung Kuo, Taipei City (TW)

(73) Assignee: TAIWAN TEXTILE FEDERATION, Taipei City (TW)

( * ) Notice: Subject to any disclaimer, the term of this patent is extended or adjusted under 35 U.S.C. 154(b) by 30 days.

(21) Appl. No.: 19/082,021

(22) Filed: Mar. 17, 2025

(51) Int. Cl.
*C09J 5/00* (2006.01)
*B32B 7/12* (2006.01)
*B32B 27/20* (2006.01)
*B32B 27/36* (2006.01)
*C09J 5/04* (2006.01)

(52) U.S. Cl.
CPC .................. *C09J 5/00* (2013.01); *B32B 7/12* (2013.01); *B32B 27/20* (2013.01); *B32B 27/36* (2013.01); *C09J 5/04* (2013.01); *B32B 2264/10* (2013.01); *B32B 2307/7265* (2013.01); *B32B 2405/00* (2013.01); *C09J 2467/00* (2013.01)

(58) Field of Classification Search
CPC .. C09J 5/00; C09J 5/04; C09J 2467/00; B32B 7/12; B32B 27/20; B32B 27/36; B32B 2264/10; B32B 2307/7265; B32B 2405/00; B32B 2038/0024
USPC ................ 156/62.2, 62.8; 264/112, 115, 118
See application file for complete search history.

(56) References Cited

U.S. PATENT DOCUMENTS

2003/0157852 A1* 8/2003 Honna .................. D06N 3/121 442/280
2004/0020411 A1* 2/2004 Sorrentino ................ C21C 5/36 106/714
2022/0396056 A1* 12/2022 Kerber .................... B32B 27/36

FOREIGN PATENT DOCUMENTS

CN 102219404 A * 10/2011
TW I754289 B * 2/2022
TW I916163 B * 2/2026

* cited by examiner

*Primary Examiner* — John L Goff, II
(74) *Attorney, Agent, or Firm* — HDLS IPR SERVICES; Chun-Ming Shih

(57) ABSTRACT

A controlling method for manufacturing waterstop tapes is disclosed and includes: controlling a reactor machine to modify a raw basic-oxygen furnace slag to prepare a modified slag material; controlling a grinding machine to sequentially perform dry grinding, wet grinding, drying and pulverizing, and dispersing processes on the modified slag material to prepare a ground powder material that meets a particle size requirement; controlling a kneading machine to mix the ground powder material with a dispersant to prepare a mixture material, and knead and granulate the mixture material with a thermoplastic polyether ester at a first mixing ratio to prepare a base granule with heat retention and deodorizing characteristics; controlling the kneading machine to mix the base granule with fresh thermoplastic polyether ester at a second mixing ratio to prepare a waterstop material, and controlling a processing machine to laminate the waterstop material to prepare a waterstop tape.

10 Claims, 3 Drawing Sheets

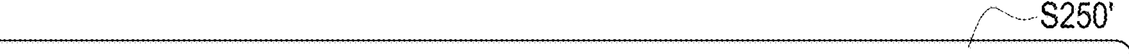

Controlling the processing machine to laminate multiple elastic polyester composite films with high bonding strength respectively between the first surface of the waterstop tape and the first surface of another waterstop tape, on the second surface of the waterstop tape, and on the second surface of another waterstop tape

S260'

Controlling the processing machine to adhere the polyester knitted fabric onto the elastic polyester composite film on the second surface of another waterstop tape to prepare the processed waterstop tape, and to adhere the elastic polyester composite film on the second surface of the waterstop tape of the processed waterstop tape onto the fabric

FIG.4A

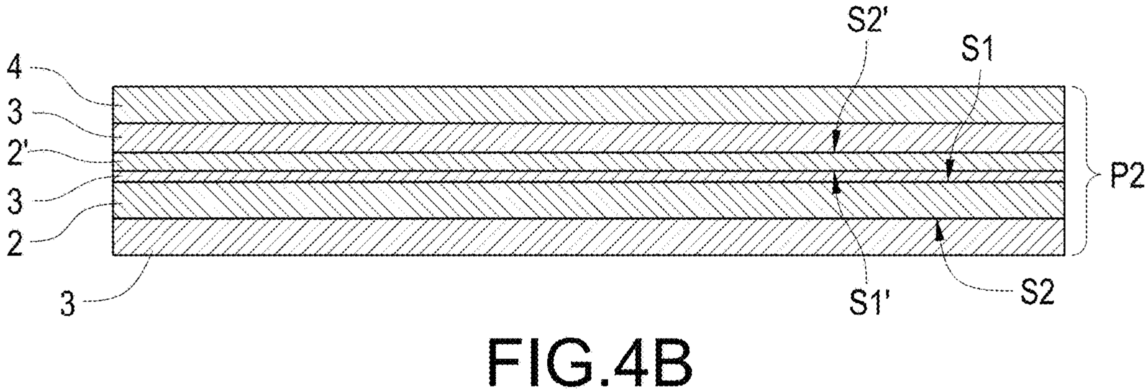

FIG.4B

CONTROLLING METHOD AND APPARATUS FOR MANUFACTURING WATERSTOP TAPES

BACKGROUND OF THE DISCLOSURE

Technical Field

The present disclosure relates to a fabric manufacturing technology, and particularly to a control method and apparatus for manufacturing waterstop tapes.

Description of Related Art

In current textile technology, fabrics can be manufactured with odor-resistant or heat-retaining materials. The odor-resistant material prevents abnormal odors from developing after prolonged wear, while the heat-retaining material enhances the fabric's warmth. Fabrics may also incorporate waterstop materials to prevent moisture intrusion. However, the waterstop materials on fabrics usually lack odor-resistant, anti-mold, and heat-retaining function. Therefore, the waterstop materials on fabrics can still develop abnormal odors, mold growth, and poor heat retention after prolonged use.

Based on this, how to prevent abnormal odors and mold growth on waterstop materials after prolonged wear, and how to maintain the heat retention of waterstop materials, are problems that those skilled in the art urgently seek to resolve.

SUMMARY OF THE INVENTION

The present disclosed is objected to provide a controlling method and apparatus for manufacturing waterstop tapes, which addresses the problems of abnormal odors and mold growth on waterstop tapes of fabrics after prolonged wear, and to prevent waterstop tapes from negatively impacting the warmth of fabrics.

In one of the exemplary embodiments, the controlling method of the present disclosure includes following steps:

step a) by a processor, controlling a reactor machine to perform a modification process on a raw basic-oxygen furnace slag to prepare a modified basic-oxygen furnace slag, step b) by the processor, controlling a grinding machine to sequentially perform a dry grinding process, a wet grinding process, a dry pulverizing process, and a dispersing process on the modified basic-oxygen furnace slag to prepare a ground powder material that meets a particle size requirement, wherein the particle size requirement includes that a specific percentage of the modified basic-oxygen furnace slag's particle size meets a specific particle size;

step c) by the processor, controlling a kneading machine to mix the ground powder material with a dispersant to prepare a mixture material and then knead and granulate the mixture material with a thermoplastic polyether ester at a first mixing ratio to prepare a base granule; and step d) by the processor, controlling the kneading machine to mix the base granule and fresh thermoplastic polyether ester at a second mixing ratio to prepare a waterstop material, and then controlling a processing machine to perform a laminating process on the waterstop material to prepare a waterstop tape.

In one of the exemplary embodiments, the controlling apparatus of the present disclosure includes:

a storage, storing a plurality of instructions; and a processor, connected to the storage, configured to access the plurality of instructions to control a reactor machine, a grinding machine, a kneading machine, and a processing machine to execute following actions:

action a) controlling the reactor machine to perform a modification process on a raw basic-oxygen furnace slag to prepare a modified basic-oxygen furnace slag;

action b) controlling the grinding machine to sequentially perform a dry grinding process, a wet grinding process, a dry pulverizing process, and a dispersing process on the modified basic-oxygen furnace slag to prepare a ground powder material that meets a particle size requirement, wherein the particle size requirement includes that a specific percentage of the modified basic-oxygen furnace slag's particle size meets a specific particle size;

action c) controlling the kneading machine to mix the ground powder material with a dispersant to prepare a mixture material and then knead and granulate the mixture material with a thermoplastic polyether ester at a first mixing ratio to prepare a base granule; and action d) controlling the kneading machine to mix the base granule and fresh thermoplastic polyether ester at a second mixing ratio to prepare a waterstop material, and then controlling the processing machine to perform a laminating process on the waterstop material to prepare a waterstop tape.

Compared with the related art, the present disclosure utilizes waste material from basic-oxygen furnace slag in industrial production. This waste material is modified, dry-ground, wet-ground, dried and pulverized, dispersed, mixed, kneaded, and granulated to prepare a specialized waterstop material. This waterstop material is then laminated to produce a waterstop tape. Therefore, the resulting waterstop tape exhibits superior far-infrared heat retention, deodorization, anti-mold properties, and water resistance compared to conventional deodorizing materials, which addresses the problems of abnormal odors and mold growth on fabric waterstops tape after prolonged wear, as well as poor heat retention in fabrics using traditional waterstop materials. Furthermore, the present disclosure applies waste material from basic-oxygen furnace slag in waterstop tapes, which reduces waste material generated during steelmaking, promotes resource reuse, and aligns with long-term national sustainability goals.

BRIEF DESCRIPTION OF THE DRAWINGS

FIG. 4A is a flowchart for further steps of the controlling method in another embodiment according to the present disclosure.

FIG. 4B is a schematic diagram of the processed waterstop tape in another embodiment according to the present disclosure.

DETAILED DESCRIPTION

Figure 1:
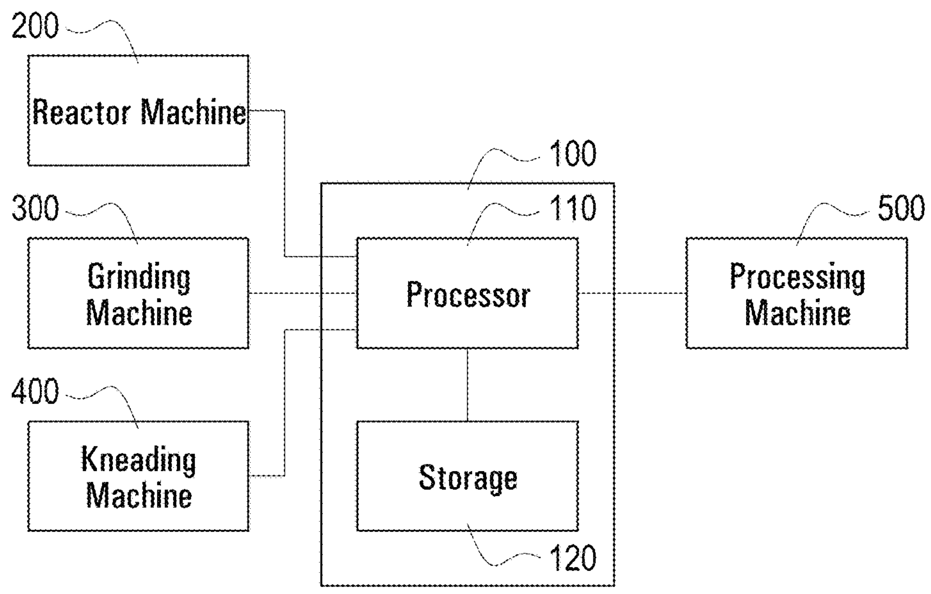
FIG. 1 is a block diagram of the controlling apparatus for manufacturing the waterstop tapes in an embodiment according to the present disclosure.

Please refer to FIG. 1, which is a block diagram of the controlling apparatus for manufacturing the waterstop tapes in an embodiment according to the present disclosure. As shown in FIG. 1, in the embodiment, the controlling apparatus 100 for manufacturing the waterstop tape in the present disclosure (referred to as the controlling apparatus 100 hereinafter) includes a processor 110 and a storage 120. The processor 110 is connected to the storage 120.

In some embodiment, the controlling apparatus 100 can be established through arbitrary types of machine controlling apparatuses (e.g., programmable logic controller (PLC), distributed control system (DCS), or edge computing device, etc.). In some embodiment, the processor 110 is connected to a reactor machine 200, a grinding machine 300, a kneading machine 400, and a processing machine 500 that are controllable, so as to respectively control the reactor machine 200, the grinding machine 300, the kneading machine 400, and the processing machine 500.

In some embodiment, the reactor machine 200 is utilized to modify the added material (i.e., to perform a modification process). In some embodiment, the reactor machine 200 may be implemented by a smelting furnace, a rotary furnace, a fluidized bed reactor, an electric arc furnace, or a combination thereof. In some embodiments, the grinding machine 300 is utilized for performing a dry grinding process, a wet grinding process, a dry pulverizing process, and a dispersing process on the added material. In some embodiments, the grinding machine 300 may be implemented by a ball mill, a sand mill, an air mill, a dispersing machine, or a combination thereof, wherein the grinding machine 300 contains yttria stabilized zirconia (YSZ) grinding balls with a Mohs hardness of 9.

In some embodiments, the kneading machine 400 is utilized to perform a mixing process, a kneading process, and a granulating process to the added material. In some embodiments, the kneading machine 400 may be implemented by a kneader, a granulator, or a combination thereof. In some embodiment, the processing machine 500 is utilized to process zipper tapes or seams on fabrics. In some embodiments, the processing machine 500 may be implemented by a laminator, a hot melt machine, a heat press machine, a welding machine, or a combination thereof.

In some embodiments, the modification process utilizes oxygen and a modifier to improve the properties of the added material, such as reducing the expansion rate of the added material (e.g., allowing the residual expansion rate of the modified material to be less than 0.4%) and removing free calcium oxide (CaO) and magnesium oxide (MgO) from the added material. In some embodiments, the modifier can be a silicate mineral (e.g., volcanic ash or fly ash) or phosphate stabilizer (e.g., calcium hydrogen phosphate), etc.

In some embodiments, the dry grinding process may involve dry sieving the added material with a sieve of a specific mesh size (e.g., 0.045 mm) and grinding balls. In some embodiments, the wet grinding process may involve wet grinding the added material with grinding balls until the particle size (i.e., the diameter of the material particles) of the added material meets a specific particle size (e.g., 1 μm).

In some embodiments, the dry pulverizing process and the dispersing process may volve disrupting the chemical and physical bonds of the added material (i.e., disrupt agglomeration). In some embodiments, the grinding machine 300 may include a laser scattering particle size analyzer and a scanning electron microscope (SEM). The laser scattering particle size analyzer is utilized to detect whether a specific percentage of the added material's particle size meets a specific particle size requirement. For example, with a specific percentage of 90% and a specific particle size of 1 μm, the laser scattering particle size analyzer may be utilized to detect whether the particle size distribution (PSD) of the added material satisfied D90 (i.e., 90% of the cumulative added material's particle size meets the 1 μm requirement). The scanning electron microscope is utilized to detect whether the shape of the material particle of the added material is sufficiently broken (i.e., meets a specific particle size requirement).

In some embodiment, the kneading process includes a heating process, a compression process, a homogenization process, and a sieving process. The heating process is utilized to heat the added material (i.e., to 150° C.~180° C.) to near the added material's melting point (i.e., not fully melting) to ensure smooth feeding. The compression process is utilized to further heat the heated material (e.g., to 180° C.~200° C.) to reach the added material's melting point and initiate melting and compression. The homogenization process is utilized to completely melt the compressed material (e.g., to 210° C.~230° C.) and uniformly mix additives to ensure a uniform distribution of the material and the additives. The sieving process is utilized to maintain the molten state of the homogenized material (e.g., at 220° C.~240° C.) and sieving the homogenized material with a sieve of another specific mesh size (e.g., 0.075 mm) to ensure the uniformity and stability of the material being outputted and to prevent excessive back pressure in the kneading machine 400 that could hinder smooth output.

In some embodiments, the storage 120 stores a plurality of instructions, the plurality of instructions are accessed by the processor 110 to execute the controlling method for manufacturing waterstop tapes described below. In some embodiments, the plurality of instructions may be implemented by arbitrary software or firmware. In some embodiments, the processor 110 may be implemented by a central processing unit (CPU), a micro control unit (MCU), a programmable logic controller (PLC), a system on chip (SoC), or a field programmable gate array (FPGA). In some embodiments, the storage 120 may be implemented by a FLASH memory, a read-only memory (ROM), a hard disk drive (HDD), or any other storing components.

Figure 2:
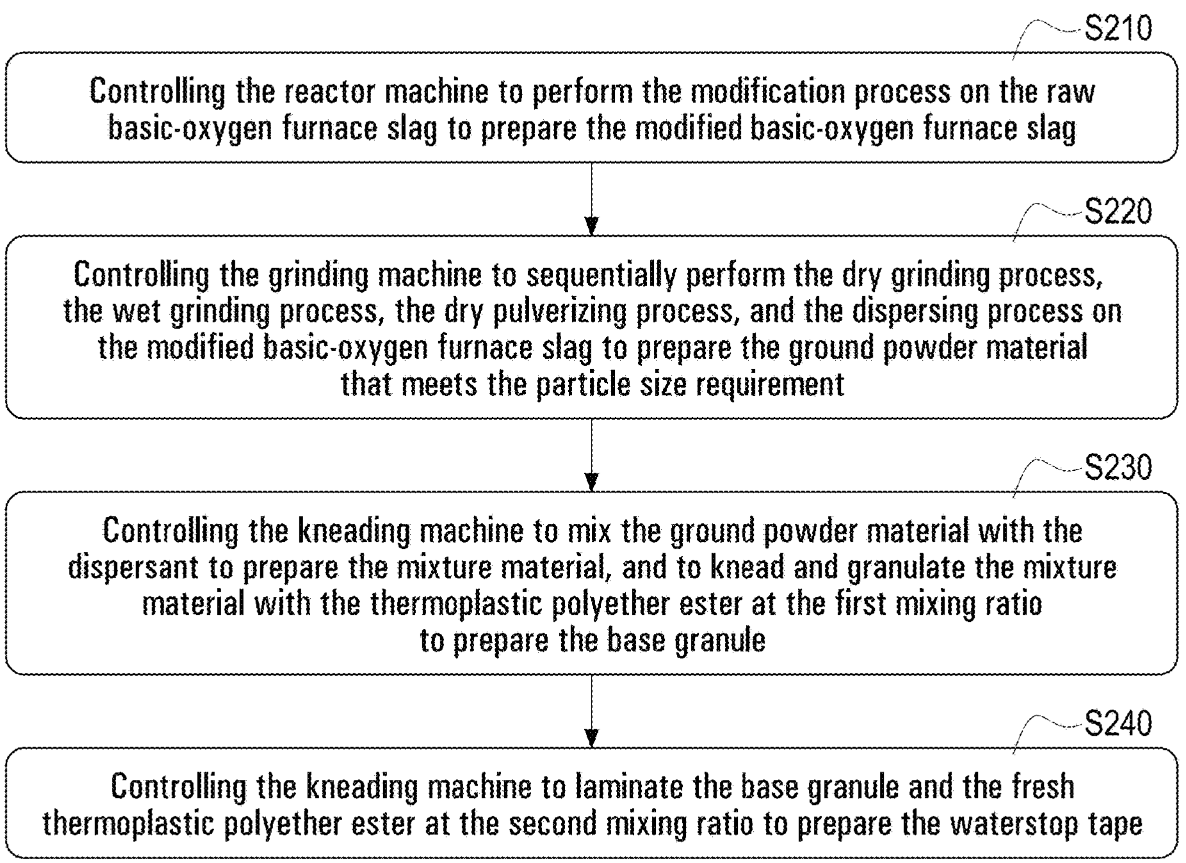
FIG. 2 is a flowchart of the controlling method for the waterstop tapes in an embodiment according to the present disclosure.

Please refer to FIG. 2 at the same time, where FIG. 2 is a flowchart of the controlling method for the waterstop tapes in an embodiment according to the present disclosure. The controlling method is applied for the controlling apparatus 100 as shown in FIG. 1. As shown in FIG. 2, the controlling method for manufacturing waterstop tapes (referred to as the controlling method hereinafter) includes steps S210 to S240.

First, in step S210, the processor 110 controls the reactor machine 200 to perform the modification process on raw basic-oxygen furnace slag to prepare modified basic-oxygen furnace slag. In some embodiment, the processor 110 controls the reactor machine 200 to perform a chemical reaction on molten raw basic-oxygen furnace slag by using oxygen and a modifier to produce the modified basic-oxygen furnace slag (i.e., modification process). In some embodiments, the raw basic-oxygen furnace slag is molten slag produced during industrial manufacturing of basic-oxygen furnace slag. In some embodiments, the modified basic-oxygen furnace slag is solidified slag of basic-oxygen furnace slag with a low expansion rate and from which free calcium oxide and free magnesium oxide have been removed.

It should be mentioned that the raw basic-oxygen furnace slag contains a large amount of free lime (i.e., free calcium oxide and free magnesium oxide), which makes the raw basic-oxygen furnace slag prone to volume expansion and flash boiling when exposed to water. Furthermore, the raw basic-oxygen furnace slag with a high content of free calcium oxide and free magnesium oxide will undergo acid-catalyzed degradation when kneaded with thermoplastic polyester elastomer (TPEE) as described in subsequent paragraphs. Therefore, the processor 110 needs to control the reactor machine 200 to use oxygen and modifiers such as silicate minerals or phosphate stabilizers to reduce the expansion rate of the raw basic-oxygen furnace slag, thereby preventing water-induced expansion and flash boiling, and acid-catalyzed degradation during subsequent addition of heat-retaining and deodorizing granules.

In step S220, the processor 110 controls the grinding machine 300 to sequentially perform the dry grinding process, the wet grinding process, the dry pulverizing process, and the dispersing process on the modified basic-oxygen furnace slag to prepare ground powder material that meets the particle size requirement. In this embodiment, the particle size requirement is that a specific percentage of the modified basic-oxygen furnace slag's particle size meets a specific particle size. For example, the particle size requirement can be preset by the user as D90, that is, the particle size of 90% of the cumulative modified basic-oxygen furnace slag meets a particle size of 1 μm. The particle size requirement can be pre-stored in the grinding machine 300.

In some embodiments, the processor 110 controls the grinding machine 300 to perform the dry grinding process (i.e., pulverizing or particle size adjustment) on the modified basic-oxygen furnace slag with grinding balls to prepare dry ground power material, and then sieves the dry ground powder material with a sieve of a specific mesh size to prepare sieved powder material (i.e., dry grinding process). In some embodiments, the processor 110 controls the grinding machine 300 to perform the wet grinding process (i.e., adding liquid to grind) on the sieved powder material with grinding balls until the scanning electron microscope in the grinding machine 300 detects that the particle size of the sieved powder material has met a specific particle size (e.g., 1 μm) to prepare wet ground powder material (i.e., wet grinding process). In other words, the scanning electron microscope has detected that the shape of the ground powder material is sufficiently broken.

In some embodiments, the processor 110 controls the grinding machine 300 to perform mechanical stress pulverization on the wet ground powder material with grinding balls (i.e., disrupt the chemical bond of the wet ground powder material) to prepare pulverized powder material (i.e., dry pulverizing process). In some embodiments, the processor 110 controls the grinding machine 300 to mix a dispersant with the pulverized powder material to prepare ground power material (i.e., dispersing process). In some embodiments, the dispersant can be a fatty acid salt or a metal soap, etc.

In some embodiments, the processor 110 controls the grinding machine 300 to continuously perform the dry grinding process, the wet grinding process, the dry pulverizing process, and the dispersing process on the modified basic-oxygen furnace slag until the particle size analyzer in the grinding machine 300 detects that a specific percentage of the ground powder material's particle size meets a specific particle size, thereby preparing the ground powder material that meets the particle size requirement. It is worth noting that only the ground powder material meeting the particle size requirement can be uniformly sieved and granulized with heat-retaining and deodorizing granules in the kneading process described in subsequent paragraphs.

In step S230, the processor 110 controls the kneading machine 400 to mix the ground powder material with a dispersant to prepare mixture material, and then controls the kneading machine 400 to knead and granulate the mixture material with thermoplastic polyether ester at a first mixing ratio to prepare base granules. In some embodiments, the kneading machine 400 may include a high-speed premixer. In some embodiments, the processor 110 controls the high-speed premixer in the kneading machine 400 to mix the ground powder material with the dispersant to prepare the mixture material (i.e., a dispersed suspension solution).

In some embodiments, the kneading machine 400 further includes a feeding zone, a compression zone, a homogenization zone, and a discharge zone. In some embodiments, the processor 110 controls the feeding zone in the kneading machine 400 to heat the mixture material to near the mixture material's melting point (i.e., heating process), and then controls the compression zone in the kneading machine 400 to further heat the heated mixture material to reach the mixture material's melting point and initiate melting and compression (i.e., compression process).

Next, the processor 110 controls the homogenization zone in the kneading machine 400 to completely melt the compressed mixture material and uniformly mix the melted mixture material with thermoplastic polyether ester at a first mixing ratio (i.e., homogenization process), and then controls the discharge zone in the kneading machine 400 to maintain the molten sate of the homogenized mixture material and sieve the homogenized mixture material with a sieve of another specific mesh size (i.e., sieving process). Next the processor 110 controls the kneading machine 400 to perform the granulating process (i.e., water strand pelletizing) on the sieved mixture material to prepare base granule. Specifically, the base granule referred to herein is formed by mixing the mixture material containing the modified basic-oxygen furnace slag and the thermoplastic polyether ester. Therefore, the base granule can be regarded as thermoplastic polyether ester with heat retention and deodorizing properties (i.e., heat-retaining and deodorizing granules). In some embodiments, the first mixing ratio can indicate a mixing percentage between the mixture material and the thermoplastic polyether ester of 20% and 80%, 16% and 84%, or 12% and 88% (the user can select a specific mixing percentage according to requirements).

In step S240, the processor 110 controls the kneading machine 400 to mix the base granule and fresh thermoplastic polyether ester at a second mixing ratio to prepare waterstop material and then controls the processing machine 500 to perform a laminating process on the waterstop material to prepare a waterstop tape. In some embodiments, the processor 110 controls a high-speed premixter in the kneading machine 400 to uniformly mix the base granule and the fresh thermoplastic polyether ester at the second mixing ratio to prepare the waterstop material.

In some embodiments, the second mixing ratio may indicate a mixing percentage between the base granule and the fresh thermoplastic polyether ester of 5% and 95%, 6.25% and 93.75%, or 8.4% and 91.6% (the user can also select a specific mixing percentage according to requirements). More specifically, when the mixture material in the base granule is 20% (i.e., the thermoplastic polyether ester is 80%), the second mixing ratio is 5% base granule and 95% fresh thermoplastic polyether ester; when the mixture material in the base granule is 16% (i.e., the thermoplastic polyether ester is 84%), the second mixing ration is 6.25% base granule and 93.75% fresh thermoplastic polyether ester; when the mixture material in the base granule is 12% (i.e., the thermoplastic polyether ester is 88%), the second mixing ratio is 8.4% base granule and 91.6% fresh thermoplastic polyether ester. Notably, the aforementioned first mixing ratio and second mixing ratio applied in the present disclosure allow the waterstop material to have excellent stability and far-infrared heat retention, deodorizing, anti-mold, and water-resistant effect.

In some embodiments, the fresh thermoplastic polyether ester refers to newly manufactured thermoplastic polyether ester granules (also known as virgin chips), and these thermoplastic polyether ester granules have not undergone recycling or reuse processes. In some embodiments, the processor 110 controls the processing machine 500 to sequentially perform crystallization drying (e.g., drying with 120° C. hot air for 4 to 6 hours), melt-casting, and cooling on the waterstop material to prepare a waterstop tape (e.g., a waterstop layer film with a thickness of 0.05 mm to 0.10 mm).

Through the aforementioned steps, the present disclosure utilizes waste material from basic-oxygen furnace slag produced during industrial production to prepare a waterstop tape with far-infrared heat retention, deodorizing, anti-mold, and water-resistant functions. Such waterstop tape may achieve same effects without using traditional waterstop materials and is more environmentally friendly due to the use of the waste material from basic-oxygen furnace slag. Furthermore, the present disclosure refines the modified basic-oxygen furnace slag waste material through various detailed grinding, modification, and dispersing processes to control the particle size within specific particle size requirements (e.g, D90), thereby enhancing the far-infrared heat retention, deodorizing, anti-mold, and water-resistant effects of the waterstop tape. On the other hand, the waste material from basic-oxygen furnace slag is very easy to be obtained (due to the large amount of recycled waste material produced during industrial manufacturing processes), and it does not require excessive consumption of production resources and material costs, making it more economical compared to conventional technologies. The preparation process of the aforementioned steps is mature and conducive to large-scale production, thus exhibiting significant market application potential.

Figure 3A:
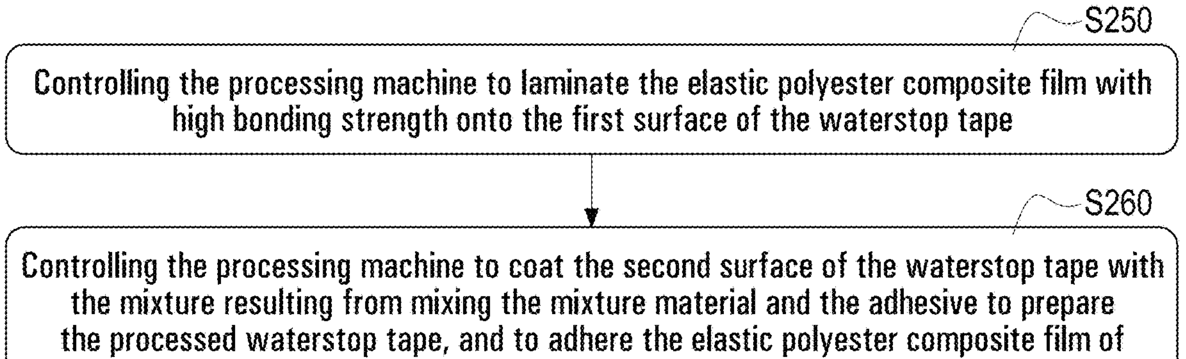
FIG. 3A is a flowchart for further steps of the controlling method in an embodiment according to the present disclosure.
Figure 3B:
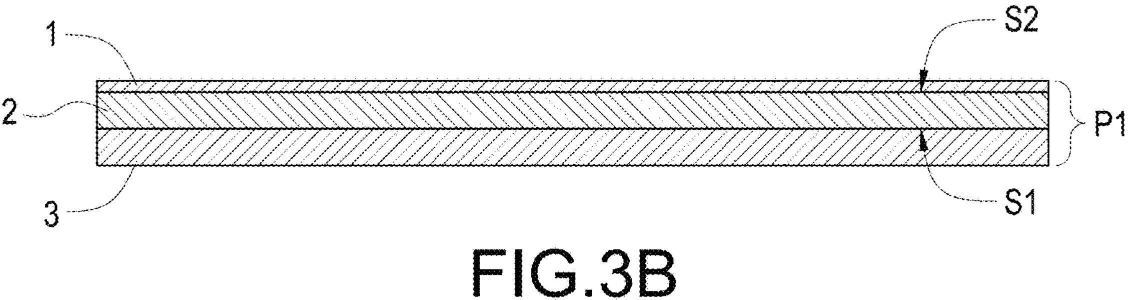
FIG. 3B is a schematic diagram of the processed waterstop tape in an embodiment according to the present disclosure.

In the following paragraphs, a real example is depicted to further interpret the processing of the waterstop tape. Please refer to FIG. 3A and FIG. 3B as the same time, wherein FIG. 3A is a flowchart for further steps S250 to S260 of the controlling method in an embodiment according to the present disclosure, and FIG. 3B is a schematic diagram of the processed waterstop tape P1 in an embodiment according to the present disclosure. As disclosed in FIG. 3A and FIG. 3B, in step S250, the processor 110 controls the processing machine 500 to laminate an elastic polyester composite film 3 with high bonding strength (e.g., elastic polyester composite film disclosed in Taiwan Patent Publication No. 1754289) onto a first surface S1 of the waterstop tape 2.

It should be noticed that, the melting point of the elastic polyester composite film 3 with high bonding strength is about 117° C., while the melting point of the waterstop tape 2 is about 200° C., therefore, when the elastic polyester composite film 3 with high bonding strength is laminated onto the waterstop tape 2, there is no risk of the waterstop tape 2 melting due to temperatures approaching its melting point (the waterstop tape 2 begins to gradually melt only at 160° C.). In other words, the low melting point elastic polyester composite film 3 with high bonding strength and the high melting point waterstop tape 2, as employed in this embodiment, allow the elastic polyester composite film 3 with high bonding strength to be adhered to the first surface S1 of the waterstop tape 2 without causing the waterstop tape 2 to melt.

Referring to FIG. 2. In step S260. The processor 110 controls the processing machine 500 to coat a second surface S2 of the waterstop tape 2 with a mixture 1 resulting from mixing the aforementioned mixture material (i.e., produced from the ground powder material mixed with the dispersant) and an adhesive (e.g., polyurethane adhesive or acrylic adhesive, etc.), thereby preparing a processed waterstop tape P1. Subsequently, the processor 110 may then control the processing machine 500 to adhere the elastic polyester composite film 3 with high bonding strength of the processed waterstop tape P1 onto fabric (e.g., a zipper tape or a seam area). It should be mentioned that, the mixture 1 used by the present disclosure functions as a deodorizing carrier, significantly enhancing the deodorizing, anti-mold, and heat retention effects of the processed waterstop tape P1.

Another real example in the following paragraphs is taken to further interpret the processing of the waterstop tape. Please refer to FIG. 4A and FIG. 4B at the same time, where FIG. 4A is a flowchart for further steps S250' to S260' of the controlling method in another embodiment according to the present disclosure, and FIG. 4B is a schematic diagram of the processed waterstop tape P2 in another embodiment according to the present disclosure. As disclosed in FIG. 4A and FIG. 4B, in step S250', the processor 110 controls the processing machine 500 to laminate multiple elastic polyester composite films 3 with high bonding strength respectively between a first surface S1 of the waterstop tape 2 and a first surface S1' of another waterstop tape 2', on a second surface S2 of the waterstop tape 2, and on a second surface S2' of another waterstop tape 2'. It should be noticed that, the low melting point elastic polyester composite film 3 with high bonding strength and the high melting point waterstop tape 2, as employed in this embodiment, allow the elastic polyester composite film 3 with high bonding strength to be adhered to the waterstop tape 2 without causing the waterstop tape 2 to melt.

In step S260', the processor 110 controls the processing machine 500 to adhere a polyester knitted fabric 4 (i.e., made of polyester fibers) onto the elastic polyester composite film 3 with high bonding strength on the second surface S2' of another waterstop tape 2', thereby preparing a processed waterstop tape P2. Subsequently, the processing machine 500 is controlled to further adhere the elastic polyester composite film 3 with high bonding strength on the second surface S2 of the waterstop tape 2 of the processed waterstop tape P2 onto fabric (e.g., a zipper tape or a seam area).

In another embodiments, the processor 110 may also control the processing machine 500 to adhere the polyester knitted fabric 4 onto the elastic polyester composite film 3 with high bonding strength on the second surface S2 of the waterstop tape 2. Subsequently, the processing machine 500 may be controlled to further adhere the elastic polyester composite film 3 with high bonding strength on the second surface S2' of another waterstop tape 2' of the processed waterstop tape P2 onto fabric (e.g., a zipper tape or a seam area). In some embodiments, the waterstop tape 2 and another waterstop tape 2' are made of same materials and by same processes, and the thickness of another waterstop tape 2' is smaller than that of the waterstop tape 2. For example, the thickness of the waterstop tape 2 is 0.05 mm to 0.10 mm, while the thickness of another waterstop tape 2' is 0.03 mm to 0.05 mm. It is noteworthy that when the fabric is to be adhered to the polyester knitted fabric 4, the primary function of another waterstop tape 2' is to prevent excessive elastic polyester composite film 3 with bonding strength from being absorbed by the polyester knitted fabric 4, thereby affecting the peel strength.

By applying the aforementioned steps, the processed waterstop tapes P1-P2 prepared by the present disclosure maintain lightweight characteristics while exhibiting good peel strength and durability, and further provide enhanced far-infrared heat retention, deodorizing, anti-mold, and water-resistant effects.

The processed waterstop tapes P1-P2 prepared by the present disclosure possess waterproof, deodorizing, and heat-retentive characteristics, and can be effectively applied in a wide range of fields. For example, in outdoor apparel and sports equipment, the processed waterstop tapes P1-P2 can be applied to waterproof zippers or seam areas to enhance the waterproof performance of clothing and equipment, while also providing deodorizing and far-infrared heat-retentive functions, improving the comfort of the wearer during outdoor activities. For another example, in textiles and shoe materials, the processed waterstop tapes P1-P2 can be applied in the waterproof design of products such as shoes and bags to prevent internal items from moisture damage, wherein this design of products is suitable for daily use due to it simultaneous deodorizing function. For a further example, in sports protective gear and health products, the processed waterstop tapes P1-P2, due to their far-infrared heat-retentive effect, are suitable for use in health protective gear such as waist supports and knee pads, promoting blood circulation, enhancing comfort and warmth. For yet another example, in outdoor tents and waterproof covers, due to the high durability, waterproof, and antibacterial deodorizing properties of the processed waterstop tapes P1-P2, they can be applied in outdoor products such as tents, raincoats, and backpack waterproof covers.

In summary, the controlling method and controlling apparatus provided by the present disclosure utilize processing methods such as modification, dry grinding, wet grinding, dry pulverization, dispersion, mixing, kneading, and granulation on waste material from basic-oxygen furnace slag, which is abundantly recycled from industrial production processes, to prepare a special waterstop material. This waterstop material is then laminated to produce a waterstop tape. Consequently, because this waterstop tape is made from ground powder material that meets particle size requirements, the waterstop tape exhibits enhanced far-infrared heat retention, deodorizing, anti-mold, and water-resistant effects compared to conventional deodorizing materials. Furthermore, the waste material from basic-oxygen furnace slag is easy to be obtained as it is abundantly recycled from industrial production processes, and requires no excessive consumption of production resources and material costs. On another aspect, the controlling method and controlling apparatus for manufacturing waterstop tapes proposed by the present disclosure further laminate the aforementioned waterstop tapes with different melting points and an elastic polyester composite film with high bonding strength to prepare a processed waterstop tape. As a result, using materials with different melting points makes the preparation process easier, and the processed waterstop tape exhibits better peel strength and durability.

The aforementioned descriptions are merely preferred embodiments of the present disclosure and should not be construed as limiting the scope of the present disclosure. Accordingly, all equivalent variations made based on the content of the present disclosure are deemed to be included within the scope of the present disclosure, as stated herein.

What is claimed is:

1. A controlling method for manufacturing waterstop tapes, comprising:

step a) by a processor, controlling a reactor machine to perform a modification process on a raw basic-oxygen furnace slag to prepare a modified basic-oxygen furnace slag;

step b) by the processor, controlling a grinding machine to sequentially perform a dry grinding process, a wet grinding process, a dry pulverizing process, and a dispersing process on the modified basic-oxygen furnace slag to prepare a ground powder material that meets a particle size requirement, wherein the particle size requirement comprises that a specific percentage of the modified basic-oxygen furnace slag's particle size meets a specific particle size;

step c) by the processor, controlling a kneading machine to mix the ground powder material with a dispersant to prepare a mixture material and then knead and granulate the mixture material with a thermoplastic polyether ester at a first mixing ratio to prepare a base granule; and step d) by the processor, controlling the kneading machine to mix the base granule and fresh thermoplastic polyether ester at a second mixing ratio to prepare a waterstop material, and then controlling a processing machine to perform a laminating process on the waterstop material to prepare a waterstop tape.

2. The controlling method in claim 1, further comprising:

by the processor, controlling the processing machine to laminate an elastic polyester composite film with high bonding strength onto a first surface of the waterstop tape; and by the processor, controlling the processing machine to coat a second surface of the waterstop tape with a mixture resulting from mixing the mixture material and an adhesive to prepare a processed waterstop tape, and then adhere the elastic polyester composite film with high bonding strength of the processed waterstop tape onto a fabric.

3. The controlling method in claim 1, further comprising:

by the processor, controlling the processing machine to laminate multiple elastic polyester composite films with high bonding strength respectively between a first surface of the waterstop tape and a first surface of another waterstop tape, on a second surface of the waterstop tape, and on a second surface of the another waterstop tape; and by the processor, controlling the processing machine to adhere a polyester knitted fabric onto the elastic polyester composite film with high bonding strength on the second surface of the another waterstop tape to prepare a processed waterstop tape, and then adhere the elastic polyester composite film on the second surface of the waterstop tape of the processed waterstop tape onto a fabric.

4. The controlling method in claim 1, wherein the first mixing ratio indicates a mixing percentage between the mixture material and the thermoplastic polyether ester of 20% and 80%, 16% and 84%, or 12% and 88%, wherein the second mixing ratio indicates a mixing percentage between the base granule and the fresh thermoplastic polyether ester of 5% and 95% when the mixture material is 20%, of 6.25% and 93.75% when the mixture material is 16%, and of 8.4% and 91.6% when the mixture material is 12%.

5. The controlling method in claim 1, wherein the step a) comprises:

by the processor, controlling the reactor machine to perform a chemical reaction on the raw basic-oxygen furnace slag through using oxygen and a modifier to produce the modified basic-oxygen furnace slag.

6. The controlling method in claim 1, wherein the step b) comprises:

step b1) by the processor, controlling the grinding machine to perform the dry grinding process on the modified basic-oxygen furnace slag with grinding balls to prepare a dry ground powder material, and to sieve the dry ground powder material with a sieve of a specific mesh size to prepare a sieved powder material;

step b2) by the processor, controlling the grinding machine to perform the wet grinding process on the sieved powder material with the grinding balls until a scanning electron microscope in the grinding machine detects that the particle size of the sieved powder material has met the specific particle size to prepare a wet ground powder material;

step b3) by the processor, controlling the grinding machine to perform a mechanical stress pulverization on the wet ground powder material with the grinding balls to prepare a pulverized powder material; and a A step b4) by the processor, controlling the grinding machine to mix a dispersant with the pulverized powder material to prepare the ground powder material.

7. The controlling method in claim 6, further comprising:

by the processor, continuously performing the step b1) to the step b4) until a particle size analyzer in the grinding machine detects that a specific percentage of the ground powder material's particle size meets the specific particle size, thereby preparing the ground powder material that meets the particle size requirement.

8. The controlling method in claim 1, wherein the step c) comprises:

by the processor, controlling a high-speed premixer in the kneading machine to mix the ground powder material with the dispersant to prepare the mixture material.

9. The controlling method in claim 1, wherein the step d) comprises:

by the processor, controlling a high-speed premixer in the kneading machine to mix the base granule with the fresh thermoplastic polyether ester at the second mixing ratio to prepare the waterstop material.

10. A controlling apparatus for manufacturing waterstop tapes, comprising:

a non-transitory storage, storing a plurality of instructions; and a processor, connected to the storage, configured to access the plurality of instructions to control a reactor machine, a grinding machine, a kneading machine, and a processing machine to execute following actions:

action a) controlling the reactor machine to perform a modification process on a raw basic-oxygen furnace slag to prepare a modified basic-oxygen furnace slag;

action b) controlling the grinding machine to sequentially perform a dry grinding process, a wet grinding process, a dry pulverizing process, and a dispersing process on the modified basic-oxygen furnace slag to prepare a ground powder material that meets a particle size requirement, wherein the particle size requirement comprises that a specific percentage of the modified basic-oxygen furnace slag's particle size meets a specific particle size;

action c) controlling the kneading machine to mix the ground powder material with a dispersant to prepare a mixture material and then knead and granulate the mixture material with a thermoplastic polyether ester at a first mixing ratio to prepare a base granule; and action d) controlling the kneading machine to mix the base granule and fresh thermoplastic polyether ester at a second mixing ratio to prepare a waterstop material, and then controlling the processing machine to perform a laminating process on the waterstop material to prepare a waterstop tape.

* * * * *